United States Patent
Lang et al.

(10) Patent No.: US 12,492,964 B2
(45) Date of Patent: Dec. 9, 2025

(54) SENSOR ROLLER

(71) Applicant: Aktiebolaget SKF, Gothenburg (SE)

(72) Inventors: Defeng Lang, Delft (NL); Andreas Clemens Van Der Ham, Utrecht (NL); Alireza Azarfar, Utrecht (NL); Dominik Fritz, Würzburg (DE); Stefan Engbers, Wuerzburg (DE); Juergen Reichert, Donnersdorf (DE)

(73) Assignee: Aktiebolaget SKF, Gothenburg (SE)

( * ) Notice: Subject to any disclaimer, the term of this patent is extended or adjusted under 35 U.S.C. 154(b) by 300 days.

(21) Appl. No.: 17/864,984

(22) Filed: Jul. 14, 2022

(65) Prior Publication Data

US 2023/0025558 A1  Jan. 26, 2023

(30) Foreign Application Priority Data

Jul. 22, 2021  (DE) .......................... 102021207844.3

(51) Int. Cl.
| | |
|---|---|
| *G01M 13/04* | (2019.01) |
| *F03D 17/00* | (2016.01) |
| *F03D 80/50* | (2016.01) |
| *F03D 80/70* | (2016.01) |

(52) U.S. Cl.
CPC .............. *G01M 13/04* (2013.01); *F03D 17/00* (2016.05); *F03D 80/50* (2016.05); *F03D 80/70* (2016.05)

(58) Field of Classification Search
None
See application file for complete search history.

(56) References Cited

U.S. PATENT DOCUMENTS

| | | | | |
|---|---|---|---|---|
| 4,203,319 A | * | 5/1980 | Lechler ................. | G01L 5/0019 73/862.541 |
| 5,952,587 A | * | 9/1999 | Rhodes ................. | G01L 5/0019 73/862.541 |
| 6,324,899 B1 | * | 12/2001 | Discenzo ........... | G01N 33/2888 73/54.02 |
| 6,535,135 B1 | * | 3/2003 | French ................. | F16C 19/522 340/682 |
| 10,371,206 B2 | | 8/2019 | Van Der Ham et al. | |
| 2003/0030565 A1 | * | 2/2003 | Sakatani ............. | G01M 13/045 340/682 |
| 2012/0323372 A1 | * | 12/2012 | Gattermann .......... | G01M 13/04 324/156 |
| 2013/0272636 A1 | * | 10/2013 | Heim ...................... | F16C 33/58 384/448 |
| 2020/0161898 A1 | * | 5/2020 | Seibert .................... | H02J 50/80 |

FOREIGN PATENT DOCUMENTS

CN          107542758 B          7/2020

* cited by examiner

*Primary Examiner* — Mark A Shabman
(74) *Attorney, Agent, or Firm* — GARCIA-ZAMOR INTELLECTUAL PROPERTY LAW, LLC; Ruy Garcia-Zamor

(57) ABSTRACT

Disclosed is a sensor roller for monitoring a lubrication condition of a roller bearing, the sensor roller providing a measuring unit for measuring at least a temperature, a speed change and a load of the roller, and a processing unit for generating a temperature profile, a speed change profile and a load profile of the roller based on the measured temperature and speed change.

7 Claims, 2 Drawing Sheets

SENSOR ROLLER

CROSS-REFERENCE TO RELATED APPLICATIONS

Figure 1:
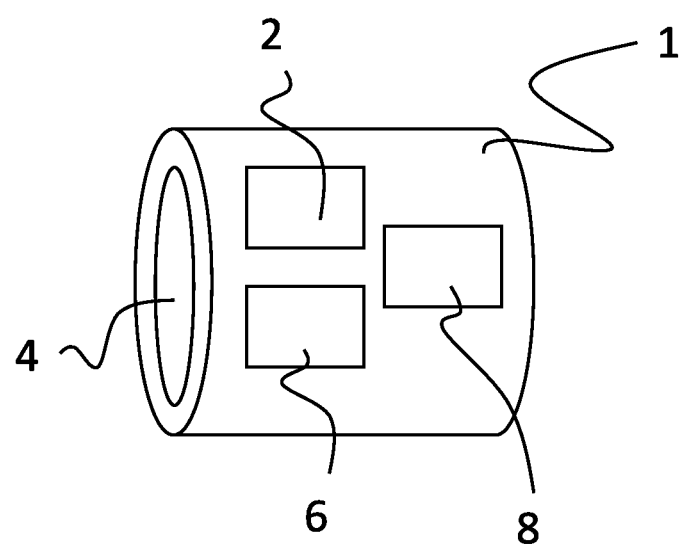

This application claims priority to German Patent Application no. 102021207844.3, filed Jul. 22, 2021, the contents of which is fully incorporated herein by reference.

TECHNICAL FIELD OF THE INVENTION

The present invention relates to a sensor roller for a roller bearing

BACKGROUND OF THE INVENTION

The monitoring of the condition of a rolling bearing, for example a roller bearing in a wind turbine, is important to ensure a proper function of the bearing and thus to avoid damages in the application where the bearing is installed. When a deterioration of the bearing condition is detected, maintenance of the bearing, for example renewal of a lubricant or re-lubrication, may be planned. This ensures a long lifetime of the bearing.

It is a particular challenge to monitor the condition inside the bearing in real time. This is necessary as maintenance actions are usually planned on a time base. It is known to use a vibration signal to detect a bearing condition change, however, for example for wind turbine applications, sometimes the vibration level in the bearing is too low to be used for that purpose. It is therefore an object of the present invention to provide a sensor roller which is able to monitor a bearing condition in a reliable manner, also in the case of low vibrations.

SUMMARY OF THE INVENTION

The sensor roller comprises a measuring unit for measuring at least a temperature, a speed change, and a load of the roller. For this purpose, the sensor roller may comprise a roller bore, which defines a cavity, and which accommodates the measuring unit. For example, the measuring unit may be attached to an inner surface of the roller bore. The measuring unit may comprise for example a temperature sensor and an accelerometer.

The sensor roller further comprises a processing unit for generating a temperature profile, a speed change profile, and a load profile of the roller. The measured signals from the measuring unit are transmitted to the processing unit, wirelessly or via a wire connecting the measuring unit and the processing unit, which processes the measured signals. Further, the processing unit may possibly transmit the measured signals and/or the profiles to a receiver outside of the bearing for further processing.

The temperature profile, the load profile, and the speed change profile are considered as providing information being representative for the loaded zone and the whole roller bearing. These profiles may thus be used for determining for example a condition of the bearing, in particular a lubrication condition. As the temperature, the load and the speed change are not dependent on the vibration of the bearing, but influence the vibration, these signals may also be used in applications having very low vibrations, as it is the case for example in wind turbines.

The bearing condition may particularly be a lubrication condition. In particular, monitoring of the lubrication condition of a bearing is important for the bearing to perform at higher efficiency and with longer life. Over-lubrication as well as insufficient lubrication will both lower the efficiency and increase the risk of earlier bearing failure.

For instance, when the lubrication condition degrades, it may result in surface-initiated damages which degrades the bearing. However, before this happens, the friction in the rolling contact, in particular in the loaded zone, will increase. The increasing friction results in a higher-than-normal temperature increase. In addition, due to the friction change, the roller exhibits a different speed change mode under a specific load condition. Thus, using the herein described sensor roller, which compares actual temperature, load, and speed change profiles with stored reference profiles, provides an easy way of detecting a lubrication condition change of the bearing and of deciding whether further actions, for example re-lubrication, are necessary.

According to an embodiment, the processing unit is further adapted to compare the generated temperature profile, speed change profile and load profile with stored reference temperature profiles, speed change profiles and load profiles. The stored profiles are preferably temperature, speed change and load profiles of a roller of an undamaged roller bearing with a healthy lubrication condition. The processing unit may then detect a lubrication condition change based on the comparison result.

The stored profiles entail generative models that capture the distribution of temperature, speed change and load. These profiles are developed using machine learning or statistical methods and capture the relation between underlying patterns of data that correspond to a particular condition. More precisely, the new measurements, i.e., the generated temperature, speed change and load profiles, are not only compared with the initial record in the memory, rather it is checked to assess whether the new measurements belong to the distribution of the initial profiles, or whether it is an anomaly to the learned model.

In a healthy or undamaged bearing, which has inter alia a healthy lubrication condition, the speed change, load, and temperature profiles have a typical pattern and development. When the lubrication condition degrades, the friction in the rolling contact may change so that, in consequence, the roller speed change profile, the load profile and temperature profile will change. Comparing the stored reference profiles and the generated profiles may thus allow to detect a lubrication condition change. Such a lubrication condition change may eventually lead to a deterioration of the bearing and should therefore be monitored.

Instead of needing an absolute measurement and decision of the actual lubrication condition, the processing unit compares the profiles which leads to a relative decision whether the lubrication condition of the bearing has changed or not. This information allows to decide whether the lubrication condition is within an acceptable range or whether the operation or the maintenance of the bearing, needs to be changed to guarantee a long lifetime and/or to maintain the efficiency level of the application where the bearing is installed.

The processing unit may further be adapted to detect a change of the lubrication condition, when the actually generated profiles and the stored profiles deviate from each other about a predefined threshold. The thresholds may be set beforehand, for example using an earlier decision model from a similar application.

According to a further embodiment, the sensor roller further comprises a memory unit for storing the temperature profiles and/or speed change profiles and/or load profiles. The memory unit may also be arranged within the bore of the sensor roller. This provides the advantage that the processing unit may retrieve the stored reference profiles without a communication to an external storage.

In order to improve the monitoring of the lubrication condition, the measuring unit may further be configured to measure a self-rotational speed of the roller and/or an orbit speed. Based on these additional values, the processing unit may be further adapted to identify the loaded zone of the bearing, in which the measured temperature and load are particularly distinct. Thus, correlating the measured parameters and the loaded zone, provides a generation of improved temperature, load, and speed change profiles. Thus, the processing unit may monitor the lubrication condition change by a combined evaluation of the roller kinematic behavior and/or the roller temperature change rate and/or the roller load.

According to a further embodiment, the processing unit is adapted to output a signal indicating a change of the lubrication condition. The processing unit may transmit the signal to a remote device, for example via radio communication. For instance, the processing unit may identify a lubrication condition change in the rolling contact and may diagnose the rolling contact condition and bearing behavior. This information is provided as output signal to the remote device and can be used for maintenance planning and decisions.

According to a further embodiment, the processing unit is adapted to store the generated temperature profile, speed change profile and/or load profile as reference profiles when the bearing is in mint condition. This means that the sensor roller monitors its temperature, roller speed change, load, and possibly further values like spinning speed and orbit position during a defined period of operation, for example when the bearing is in mint condition. These values are then used to generate the reference speed change, load and temperature profiles as described above. By recording and storing initial profiles during a learning phase when the bearing is new or newly maintained, reference profiles can be set indicating the healthy or mint condition of the bearing, of the lubrication.

Instead of recording initial profiles of the actual bearing, the stored profiles may be a temperature profile, a speed change profile and/or a load profile of a similar roller bearing. Such profiles may be generated in similar roller bearings and may then be transferred to the actual bearing and may for example be stored in the memory unit of the sensor roller. In this case, the processing unit may directly compare generated profiles with stored profiles and may start with monitoring the bearing condition directly instead of first generating reference profiles.

According to a further embodiment, the processing unit is adapted to update the stored temperature profile, speed change profile and/or load profile based on the generated temperature profile, speed change profile and/or load profile. During the application, the temperature, load and/or speed change profiles may be periodically recorded. When the processing unit detects no change of the lubrication condition or at least only within a predefined acceptable range, the actually generated profiles may be used for updating the stored profiles. For this, machine learning algorithms or the like may be used.

The update could be realized through online machine learning or incremental machine learning techniques which are used when data becomes available in sequential order and there is a need to dynamically adapt to new patterns in the data. In this case, the input data is continuously used to extend the existing model's knowledge. When the processing unit detects changes within a predefined acceptable range, the generated profiles will be used for updating the stored profiles.

According to a further aspect, a method for monitoring a bearing condition is provided. The method comprises the following steps: measuring at least a temperature, a load, and a speed change of a roller of the bearing, generating a temperature profile, load profile and a speed change profile of the roller based on the measured temperature, load, and speed change.

The features and elements described with correspondence to the sensor roller also apply to the described method for monitoring a bearing condition.

An even further aspect of the present invention relates to a computer program product comprising a computer program code which is adapted to prompt a control unit, e.g., a computer, and/or a computer of the above discussed manufacturing arrangement to perform the above discussed steps.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE INVENTION

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In the following, preferred embodiments of the invention are described in relation to the drawings, wherein the drawings are exemplarily only, and are not intended to limit the scope of protection. The scope of protection is defined by the accompanied claims, only.

The figures show:

FIG. 1: a schematic perspective view of a sensor roller; and

Figure 2:
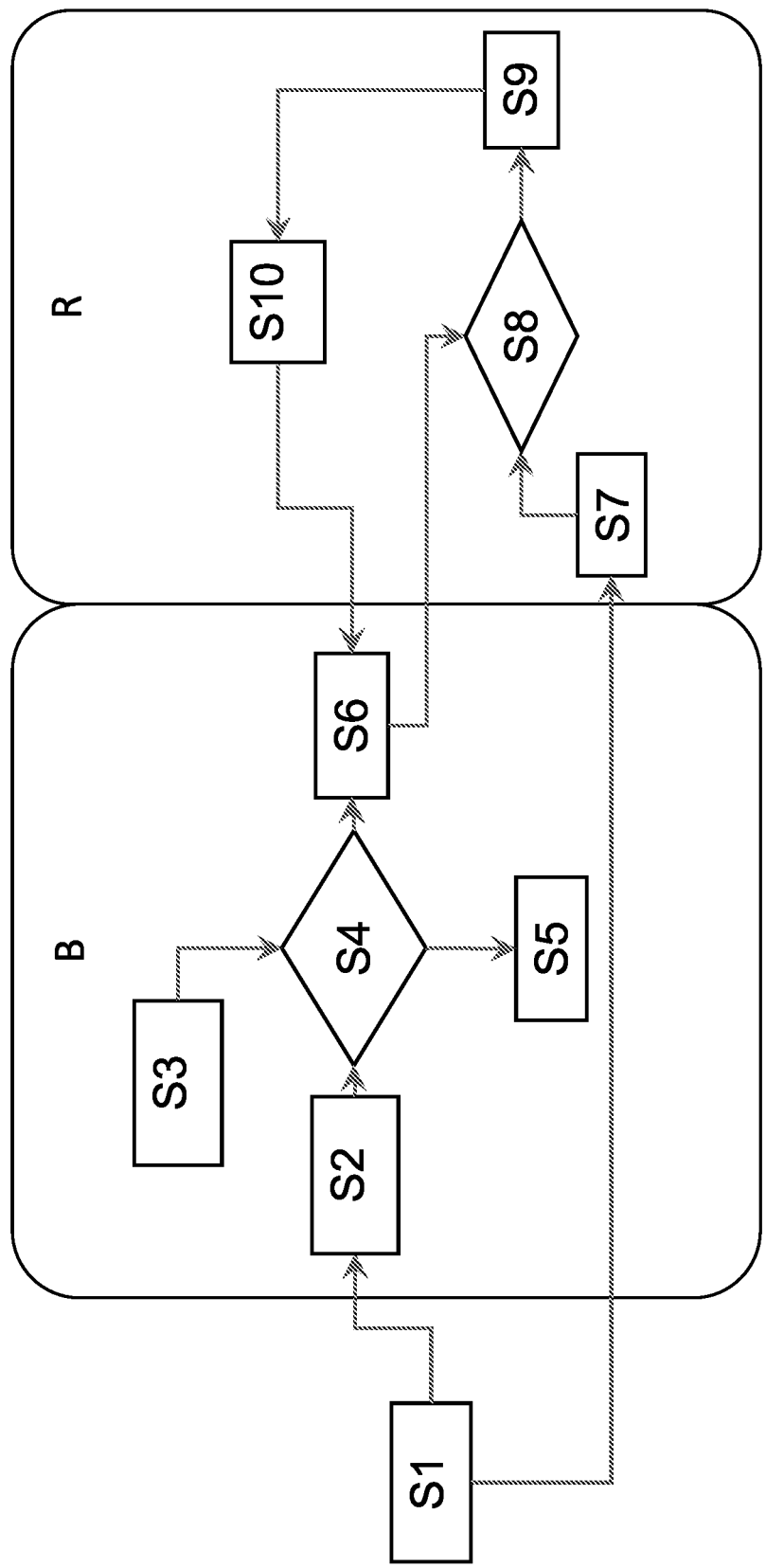

FIG. 2: a schematic block diagram of a method for monitoring a bearing condition.

In the following same or similar functioning elements are indicated with the same reference numerals.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty) (20°) degrees, provides specific literal support for any angle greater than twenty) (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows a sensor roller 1. The sensor roller 1 may be used for example in a roller bearing within a wind turbine or similar application. In such applications, standard sensor rollers detecting vibration signals may not be used as the vibrations are too low in order to be used for detecting a bearing condition., in particular a lubrication condition.

Thus, the sensor roller 1 comprises a measuring unit 2 which measures at least a temperature, a load, and a speed change of the roller 1. For this purpose, the sensor roller 1 may comprise a roller bore 4, which defines a cavity. The measuring unit 2 may be arranged in the cavity and may be attached to an inner surface of the roller bore 4.

The measuring unit 2 comprises multiple sensors, for example a temperature sensor, load sensor and an accelerometer (not shown). Also, other sensors, like gyrometers, position sensors, speed sensors or the like, may be used. The sensors may be arranged within the cavity or may be arranged elsewhere on the sensor roller 1 and may communicate with the measuring unit 2 via radio communication.

The sensor roller 1 further comprises a processing unit 6 for generating a temperature profile and a speed change profile of the roller 1. The processing unit 6 receives the measured signals from the measuring unit 2, wirelessly or via wired connection.

The temperature profile, the load profile and the speed change profile generated by the processing unit 6 define a pattern or development of the temperature as well as the load and the speed change of the roller 1 over time. Based on the information regarding the temperature, load, and speed change of the roller 1, the processing unit 6 may detect a lubrication condition, i.e., lubrication information being representative for the whole roller bearing 1. As the temperature, load and the speed change are independent of the vibration of the bearing, these signals may also be used in applications having very low vibrations.

In order to monitor and detect the lubrication condition, the processing unit 6 compares the generated temperature profile, load profile and speed change profile with stored reference temperature profiles, load profiles and speed change profiles. The profiles may be stored in a memory unit 8 being also arranged within the roller bore 4.

In particular, the temperature, load and speed change profiles are profiles indicating an undamaged roller bearing, i.e., a healthy lubrication condition. The processing unit 6 detects a lubrication condition change when the stored profiles deviate from the generated profiles. The processing unit 6 can decide whether there is a lubrication condition change when the deviation between the profiles is greater than a predefined threshold.

A possible algorithm being implemented by the processing unit 6 will be described in the following with respect to FIG. 2.

At the beginning B of the application, i.e., when the roller bearing is newly installed or maintained and is thus in mint condition, the measured signals from the measuring unit 2 (S1) may be processed for generating temperature, load and speed change profiles which indicate an initial healthy lubrication condition of the roller bearing (S2).

To verify the initial healthy condition, the generated temperature, load, and speed change profiles are compared (S4) with reference information, like reference profiles from offline testing, similar applications, analytical results and/or other historical data (S3).

When the generated temperature, load and speed change profiles deviate from the reference information, this may indicate an initial abnormal lubrication condition of the bearing. The processing unit 6 may output a signal to inform about such an abnormal condition (S5).

If the initial healthy lubrication condition of the bearing is verified in step S4, the processing unit 6 stores the generated profiles as reference profiles for the further process (S6).

During the running period (R), the measuring unit 2 continues to measure the temperature, load, and speed change of the sensor roller 1 (S1). The measured signals are used by the processing unit 6 for generating temperature, load, and speed change profiles (S7).

Subsequently, the processing unit 6 compares the generated temperature, load, and speed change profiles with the stored profiles from the beginning B (S8). This is done in line with the comparison of step S4.

However, during the running period R, the processing unit 6 outputs a signal indicating the lubrication condition, indicating a lubrication condition change, S9. When the lubrication condition has not changed, it is assumed that the bearing has still a healthy lubrication condition. In this case, the processing unit 6 may use the actually generated profiles for updating the stored profiles (S10).

In addition to temperature, load and speed change values, the measuring unit 2 may measure further parameters like a self-rotational speed of the roller 1 or an orbit speed. Based on these additional parameters, the processing unit 6 may identify a loaded zone of the sensor roller 1. The loaded zone, in which the temperature, load and speed change are distinct, may be used for improving the generation of the temperature, load and speed change profiles. This may further improve the detection of a lubrication condition change based on the comparison result.

In summary, the herein described sensor roller provides a vibration independent detection of a lubrication condition change. Particularly, the lubrication condition change is detected by a combined evaluation of the roller kinematic behavior and/or the roller temperature change rate and/or the roller load.

The invention claimed is:

1. A sensor roller for a roller bearing, the sensor roller comprising:
    a measuring unit for measuring at least a temperature, a speed change, and a load of the roller, wherein
    the sensor roller comprises a processing unit for generating a temperature profile, a speed change profile and a load profile of the roller based on the measured temperature, speed change and load, wherein
    the sensor roller further comprises a memory unit that stores temperature profiles, speed change profiles, and load profiles of the roller, wherein the processing unit is configured to compare the generated temperature profile, the generated speed change profile, and the generated load profile with the stored temperature profiles, the stored speed profiles, and the stored load profiles, and wherein the processing unit is configured to update the stored temperature profiles, the stored speed change profiles, and the stored load profiles based on the comparison to the generated temperature profile, the generated speed change profile and the generated load profile.

2. The sensor roller according to claim 1, wherein the processing unit is further adapted to compare the generated temperature profile, speed change profile and load profile with stored reference temperature profiles, speed change profiles and load profiles of a roller of an undamaged roller bearing and to detect a bearing condition change based on the comparison result.

3. The sensor roller according to claim 2, wherein the bearing condition is a lubrication condition.

4. The sensor roller according to claim 1, wherein the measuring unit is further configured to measure a self-rotational speed of the roller and/or an orbit speed.

5. The sensor roller according to claim 1, wherein the processing unit is adapted to output a signal indicating a change of the lubrication condition.

6. The sensor roller according to claim 1, wherein the processing unit is adapted to store the generated temperature profile, speed change profile and/or load profile as reference profiles during a defined period of operation.

7. A method of using a sensor roller to monitor a bearing condition, the method comprising the following steps:
provide the sensor roller comprising a measuring unit, a processing unit, and a memory unit,
measuring at least a baseline temperature, a baseline load, and a baseline speed change of a roller of the bearing,
storing the baseline temperature, the baseline load, and the baseline speed change within the memory unit as a baseline temperature profile, a baseline load profile, and a baseline speed change profile,
measuring at least an operational temperature, an operational load, and an operational speed change of the roller of the bearing
generating a temperature profile, a load profile, and a speed change profile of the sensor roller based on a comparison between the measured operational temperature, the measured operational load, and the measured operational speed change and the baseline temperature profile, the baseline load profile, and the baseline speed change profile, and
updating the stored baseline temperature profile, the stored baseline load profile, and the stored baseline speed change profile with the generated temperature profile, the generated load profile, and the generated speed change profile within the memory unit,
wherein the steps of measuring are carried out by the measuring unit and the steps of generating are carried out by the processor.

* * * * *